US009883492B2

(12) United States Patent
Koudouridis et al.

(10) Patent No.: US 9,883,492 B2
(45) Date of Patent: Jan. 30, 2018

(54) METHOD FOR ALLOCATING RADIO RESOURCES, AND RADIO RESOURCE ALLOCATOR

(71) Applicant: Huawei Technologies Co., Ltd., Shenzhen, Guangdong (CN)

(72) Inventors: George Koudouridis, Kista (SE); Pablo Soldati, Kista (SE); Jaap Van De Beek, Taby (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 14/958,647

(22) Filed: Dec. 3, 2015

(65) Prior Publication Data

US 2016/0150526 A1 May 26, 2016

Related U.S. Application Data

(63) Continuation of application No. PCT/EP2013/061345, filed on Jun. 3, 2013.

(51) Int. Cl.
*H04W 72/04* (2009.01)
*H04W 28/16* (2009.01)

(52) U.S. Cl.
CPC ....... *H04W 72/0413* (2013.01); *H04W 28/16* (2013.01); *H04W 72/0453* (2013.01); *H04W 72/0433* (2013.01)

(58) Field of Classification Search
CPC .................................................. H04W 72/04
See application file for complete search history.

(56) References Cited

U.S. PATENT DOCUMENTS

2011/0136518 A1* 6/2011 Hsu .................. H04W 74/02
455/466
2012/0082104 A1* 4/2012 Lysejko ............ H04W 72/082
370/329

(Continued)

FOREIGN PATENT DOCUMENTS

| WO | WO 02/30134 A2 | 4/2002 |
| WO | WO 2011/046477 A1 | 4/2011 |
| WO | WO 2012/123310 A1 | 9/2012 |

OTHER PUBLICATIONS

"Final Report of 3GPP TSG RAN WG1 #67 v1.0.0 (San Francisco, USA, Nov. 14-18, 2011)", MCC Support, 3GPP TSG RAN WG1 Meeting #68, Dresden, Germany, Feb. 6-10, 2012, 89 pages, R1-120001.

*Primary Examiner* — Zhiren Qin

(57) ABSTRACT

A method in a radio resource allocator of a radio access network is disclosed. The network comprises at least one first layer and at least one second layer, the first layer is higher than the second layer; and the method in a first radio resource allocator of the first layer comprises: decides if a second radio resource allocator of the second layer in an autonomous mode or in a controlled mode for at least one portion of available radio resources; when the second radio resource allocator in the autonomous mode, allocates the at least one portion of available radio resources to the second radio resource allocator; when the second radio resource allocator in the controlled mode, allocates the at least one portion of available resources to radio resource users of the radio resource users of the second radio resource allocator and/or radio resource allocators of a third lower layer.

23 Claims, 6 Drawing Sheets

(56) References Cited

U.S. PATENT DOCUMENTS

| | | | |
|---|---|---|---|
| 2012/0108255 A1* | 5/2012 | Jo | H04W 72/1263 455/450 |
| 2012/0182930 A1* | 7/2012 | Sawai | H04B 7/026 370/315 |
| 2012/0257581 A1 | 10/2012 | De Debjani | |
| 2012/0309291 A1* | 12/2012 | Sawai | H04B 7/15542 455/7 |
| 2013/0039246 A1* | 2/2013 | Park | H04W 52/0216 370/311 |
| 2014/0029465 A1* | 1/2014 | Nagata | H04B 7/024 370/252 |
| 2014/0126530 A1* | 5/2014 | Siomina | H04W 52/146 370/330 |

* cited by examiner

METHOD FOR ALLOCATING RADIO RESOURCES, AND RADIO RESOURCE ALLOCATOR

CROSS-REFERENCE TO RELATED APPLICATIONS

This application is a continuation of International Application No. PCT/EP2013/061345, filed on Jun. 3, 2013, which is hereby incorporated by reference in its entirety.

TECHNICAL FIELD

The present invention relates to a method in a radio resource allocator of a radio access network for allocating radio resources. Furthermore, the invention also relates to a radio resource allocator device, a computer program, and a computer program product thereof.

BACKGROUND

One component solution for meeting the rapidly increasing demand for data in future networks (a projected 1000 times increase in the coming decade) is believed to be a huge densification of a radio network's infrastructure. Essentially, by increasing the number of network access points per square meter, the average distance between an access point and a mobile node is reduced and, furthermore, it is likely that less user mobiles need to be served per access point. Both of these effects account for a potential increase of the average data rates per user, and thus a huge increase of the network's sum-rate.

FIG. 1 illustrates a general access network topology where nodes (network access points, APs and user equipment nodes, UEs) are connected by an edge if the signal to noise ratio would allow data communication. While FIG. 1a illustrates a general case, FIG. 1b and FIG. 1c show extreme cases with respect to the network's density. Historically, radio access networks have been of the sparse type as illustrated in FIG. 1b, i.e., the number of UEs greatly exceeds the number of APs. In contrast, future ultra-dense networks are believed to be better reflected by the network topology in FIG. 1c, i.e., the number of APs in a certain geographical region greatly exceeds the number of UEs.

It is not likely that future networks will be ultra-dense everywhere and all the time. Typically, for reasons of deployment costs for instance, the dense network scenario topology of FIG. 1c (more APs than UEs) will be relevant for hotspots (indoor environment) and urban scenarios where the necessary backhaul infrastructure solutions are affordable. In other geographical regions, the classical network topology of FIG. 1b (less APs than mobile users) will still be the most efficient solution.

In a radio network where many different independent radio devices wish to communicate with each other, simultaneously and geographically in each other's proximity, radio interference is inevitable. In cellular networks, for instance, typically a number of access points jointly constitute a radio access network to which a large number of mobile devices can simultaneously connect. Not only is there a potential interference when a number of mobile devices in each other's vicinity wish to communicate with the same access point (intra-cell interference), but in regions where multiple access points can be received, a user may experience inter-cell interference. Furthermore, in a mesh network where a large number of users can connect to any other user in the network directly, interference is also imminent if no proper measures are taken. For the sake of minimizing this interference, typically, radio networks employ means to manage this interference.

Recently, the increasing energy consumption of radio networks has become more of an (economic and environmental) concern to the network operators. The transmit power required to accomplish the network's data communication, hence not only should be optimized with respect to the above-mentioned interference and the spectral efficiency, but also with respect to the network's cost related to the energy consumption. Power should not be wasted.

The limited physical nature of time, radio spectrum, and transmit power, quantities that all play an important role in radio interference, have given relevance to the notion of a radio resource, a generic term used to describe any of these quantities. An improper management of these quantities creates interference. Management of time and frequency involves the assignment of time-slots and frequency bands to relevant radio nodes, along with a grant or instruction to transmit a (maximum) radio power.

Another relevant conceptual notion is the distinction between the data plane and the control plane. While the data plane is concerned with the processing, transmission and reception of the voice or video signal or the data packets, the control plane deals with all kinds of signalling messages that handle the bookkeeping in the communications: these signalling messages assure that the data packets are not lost, that they arrive in time, and with the proper radio characteristics, that can be read by the intended receiver, etc. For a good management of the spectral efficiency and the energy-efficiency, a well-designed control plane is essential in most of today's networks.

Future networks represented by a geographical and temporal mix of the conceptual topologies in FIGS. 1b and 1c come with a number of new challenges related to the spectral efficiency and the energy efficiency.

First, in general, when the average distance between a network's access point decreases more than the average power of these access points (FIG. 1c), interference is likely to become more of a problem and radio resources must be efficiently managed to reduce this interference. At the same time, these management protocols should be implemented without increasing the load of the network's control plane. Also, when the network density increases more than the user density, the network's power consumption will potentially increase significantly. Simply, there will be more access points per user and, non-linearity of the power consumption (there is always a certain fixed power consumed, regardless how little data will be transmitted) will in principle cause the power per transmitted bit also to increase. For these reasons it is desirable that radio resources in an ultra-dense network are managed in such a way that energy-consumption per transmitted bit is low and that interference is kept low.

Moreover, in the mixed networks described above, where certain regions are sparse and other regions are dense (and where these local density-characterization changes from time to time), there is a need to manage the radio resources in a way that adapts to the network density reigning at a certain time and place. In particular, it is a problem to match access points and mobiles and assign radio resources in such a way that interference, energy consumption or other objective function are optimized, and in such a way that it is tailored to both ultra-dense regions of a network (FIG. 1c) and sparse regions of the same network (FIG. 1b).

Historically, several high-level concepts have been deployed to allocate radio resources in a network.

Frequency Planning and Frequency Re-Use

One traditional way to manage these limited radio resources is by assigning a fixed frequency to a certain geographical region. In second generation systems a licensed frequency band was partitioned into 3 disjoint sub-bands (reuse factor 3) and each base station was assigned one of these sub-bands. The assignment was fixed and static (could only be changed by reconfiguring the base station). Prior to deployment of the network a careful planning of the sub-band assignment was carried out in order to assure that base stations in each other's vicinity did not use the same sub-bands hence interference among different access points was reduced. A drawback of this type of planning is that it is static in nature, not flexible, expensive and generally inefficient.

Radio Network Controller Node

In third generation systems, all base stations use the entire licensed frequency band (frequency re-use 1). Much of the interference control and resource management is done by means of power control of the dedicated assigned radio channels. In particular an (outer loop) power control is carried out between the radio network controller, the RNC (a central network node) and each mobile node. A drawback with this prior art is its inefficiency with respect to interference control.

Multi-User Scheduling

In fourth generation systems (LTE), all base stations still use the entire licensed frequency band (frequency re-use 1) and the concept of multi-user scheduling in a common radio channel was introduced. Each user reports the quality of the channel (e.g., the level of interference it experiences) and the base station determines based on this information which radio resource to assign to each user. In the related art LTE system, co-channel and non-co-channel access point can be deployed in the same geographical area as illustrated in FIG. 2. A drawback with this prior art is a lack of good coordination between base stations and its efficiency with respect to inter-cell interference.

Access-Point on/Off Activity Scheduling

Access-point on/off activity scheduling was recently proved to lead to substantial energy savings and spectral efficiency gain in LTE-compliant heterogeneous network deployments.

Inter-Cell Interference Coordination (ICIC)

Inter-cell interference coordination (ICIC) was introduced in LTE systems to handle mitigate interference at the cell-edge. Neighbouring base stations exchange information related to interference measurements and as well as sub-frames where a base station shall refrain from transmitting data and control channels, referred to as called almost blank subframes (ABS). Interference indicators from other subframes are used for power control and scheduling to mitigate the interference at the neighbouring cell, whereas a schedule of ABS in a neighbouring cell is used to schedule cell-edge users in protected subframes where the neighbouring cells are silent.

SUMMARY

An objective of the present embodiments of the invention is to provide a solution which mitigates or solves the drawbacks and problems of prior art solutions.

Especially, a specific objective of the invention is to provide radio resource allocation solutions improving radio resource efficiency compared to prior art solutions.

According to a first aspect of the embodiment of the invention, the above mentioned objectives are achieved by a method in a radio resource allocator of a radio access network including radio resource allocators of different hierarchical layers, the network comprising at least one first layer having at least one first resource allocator and at least one second layer having at least one second resource allocator, the first layer being a hierarchical higher layer in relation to the second layer; and the method in a first radio resource allocator of the first layer comprises the steps of:

deciding if a second radio resource allocator of the second layer should operate in an autonomous mode or in a controlled mode for at least one portion of available radio resources; and allocating said at least one portion of available radio resources to said second radio resource allocator if it is decided that said second radio resource allocator should operate in the autonomous mode, wherein said at least one portion of available resources is further allocated by said second radio resource allocator to its radio resource users and/or radio resource allocators of a third lower layer, or allocating said at least one portion of available radio resources to radio resource users of said second radio resource allocator and/or radio resource allocators of a third lower layer if it is decided that said second radio resource allocator should operate in the controlled mode.

Different preferred embodiments of the above method are defined in the appended dependent claims.

The method according to the present embodiment of the invention may be comprised in computer program having code means which when run by processing means executes the present method.

According to a second aspect of the embodiment of the invention, the above mentioned objects are achieved by a radio resource allocator device arranged for allocating radio resources in a radio access network including radio resource allocators of different hierarchical layers, the network comprising at least one first layer having at least one first resource allocator and at least one second layer having at least one second resource allocator, the first layer being a hierarchical higher layer in relation to the second layer; and said radio resource allocator being a first radio resource allocator and further being arranged to:

decide if a second radio resource allocator of the second layer should operate in an autonomous mode or in a controlled mode for at least one portion of available radio resources; and allocate said at least one portion of available radio resources to said second radio resource allocator if it is decided that said second radio resource allocator should operate in the autonomous mode, wherein said at least one portion of available resources is further allocated by said second radio resource allocator to its radio resource users and/or radio resource allocators of a third lower layer, or allocate said at least one portion of available radio resources to radio resource users of said second radio resource allocator and/or radio resource allocators of a third lower layer if it is decided that said second radio resource allocator should operate in the controlled mode.

The present embodiment of the invention provides a method and a device for allocating radio resources in a radio access network that improves network operation in terms of energy-, cost- and spectrum-efficiency, by providing an integrated multi-layer approach to resource scheduling of its available radio resources. In particular, the present embodiment of the invention provides flexible adaptation of the network infrastructure to user mobility and traffic distribution so as to optimize energy-, cost-, and spectrum-efficiency, such as network throughput, capacity, etc.

Further applications and advantages of the embodiments of the invention will be apparent from the following detailed description.

BRIEF DESCRIPTION OF THE DRAWINGS

The appended drawings are intended to clarify and explain different embodiments of the present invention in which.

DETAILED DESCRIPTION

Figure 4:
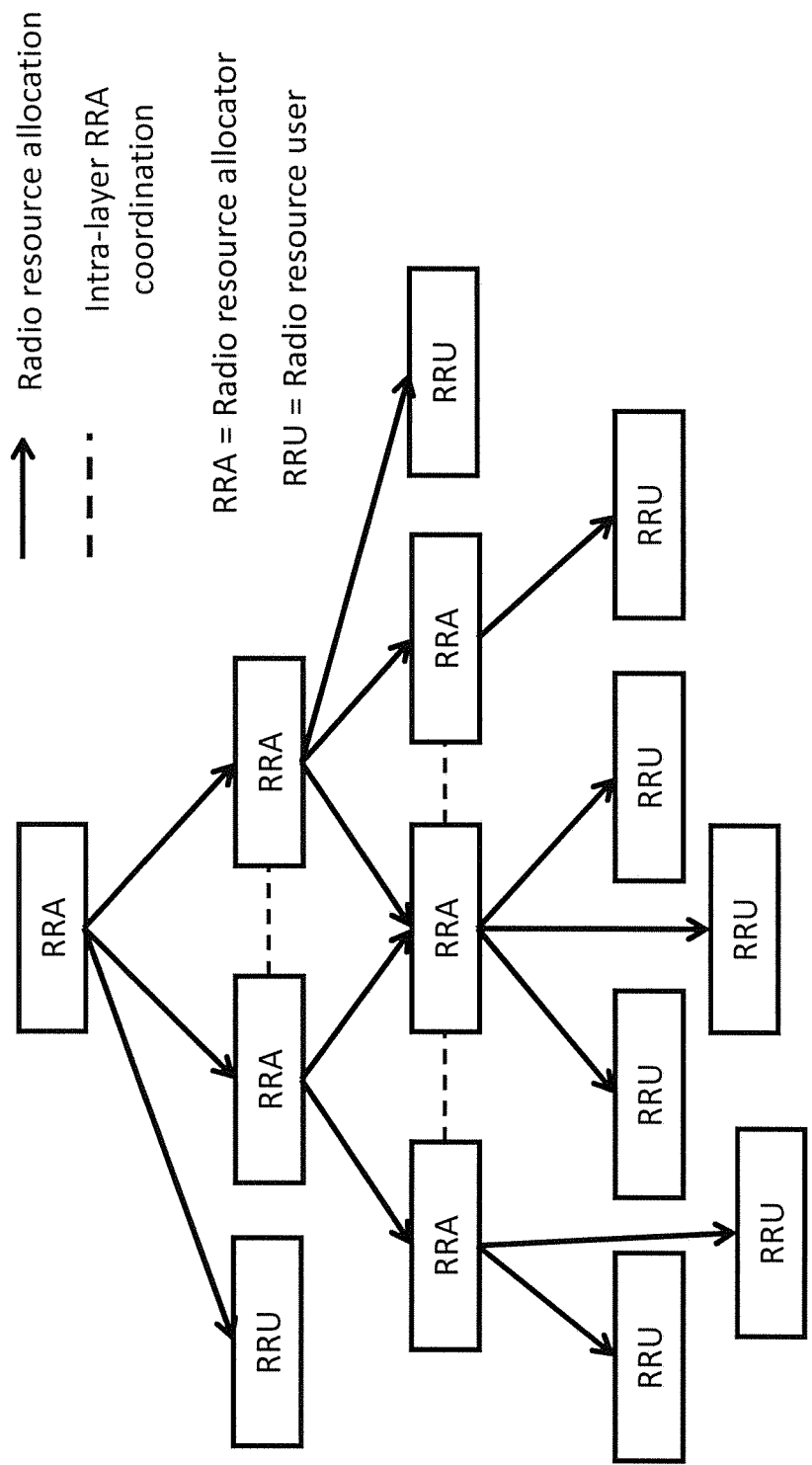
FIG. 4 illustrates structure of a hierarchical network of radio resource allocators.
Figure 5:
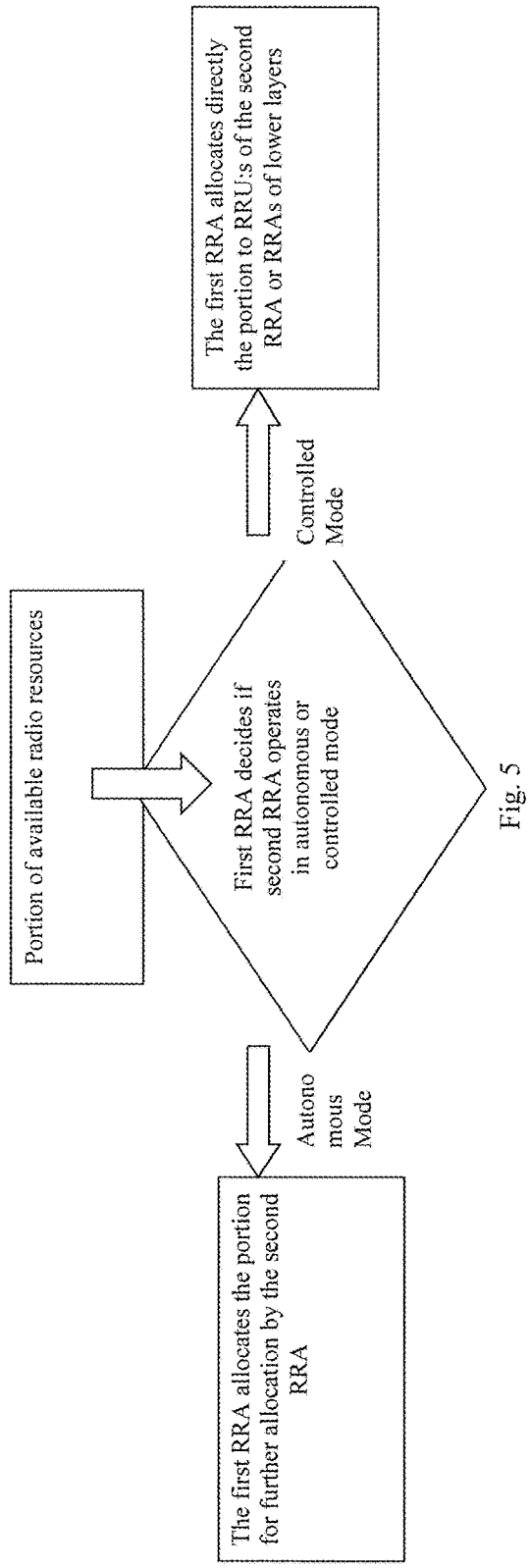
FIG. 5 is a high level illustration of the embodiment of the invention.

The embodiment of the invention disclosed in this application is a method for allocation of available radio resources to resource users and/or radio resource allocators in a layered and/or hierarchical network of resource allocators. FIG. 4 illustrates such a hierarchical structure with different layers.

A radio resource is understood to be a certain portion of time, and/or a certain portion of the available frequency spectrum, and/or a certain maximum power used for radio transmission. While this disclosure uses the term allocation, it is also understood that the terminology "allocation", "assignment", "scheduling", and "granting right" have the same meaning.

A radio resource user (RRU) is understood here to be any radio transmitter or receiver in the network that uses radio resources for the purpose of communicating any type of data traffic.

A radio resource allocator (RRA) is understood here to be a functional entity in the network that is arranged for suitable allocation of the radio resources among the resource users of the network. RRAs in this embodiment of the invention appear in a hierarchical and/or layered structure.

In each layer of this structure (as illustrated in FIG. 4) except the highest layer, an RRA can be connected to one or more RRAs in a higher hierarchical layer, referred to as the parent RRAs. An RRA is allocated radio resources by its parent RRAs. In each layer of this structure, an RRA is connected to one or more RRAs and/or to one or more resource users in a lower hierarchical layer, referred to as the children RRAs. An RRA allocates radio resources to its children RRAs or to its resource users.

An RRA operates on a certain portion of available radio resources assigned to it by its parent RRAs. The highest RRAs in the hierarchy, not having any parent RRAs has its portion of the available resources allocated to it by means of e.g. a license, a policy, an inter-operator agreement, etc. RRAs residing at the same hierarchical layer can be connected and coordinate with each other to allocate resources to lower layers. We shall refer to this as intra-layer or horizontal RRAs coordination.

Figure 1A:
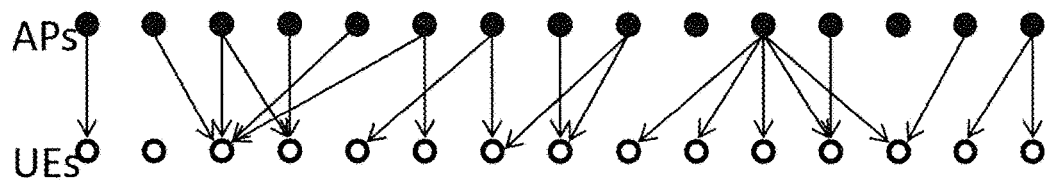
FIGS. 1(a) thru 1(c) illustrate dense and sparse radio access networks. (a) A general access network topology where edges denote potential connections between access nodes (AP) and user equipment (UE) nodes. (b) A "classical" (sparse) access network in which the number of UEs largely exceeds the number of APs. (c) A future (dense) access network in which the number of access points largely exceeds the number of UEs.
Figure 1B:
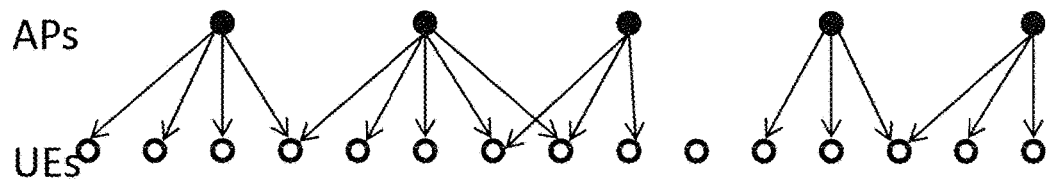
Figure 1C:
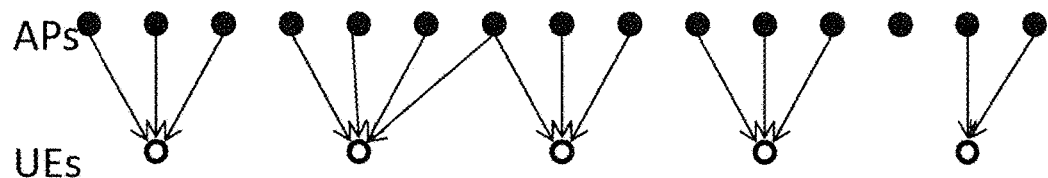
Figure 2:
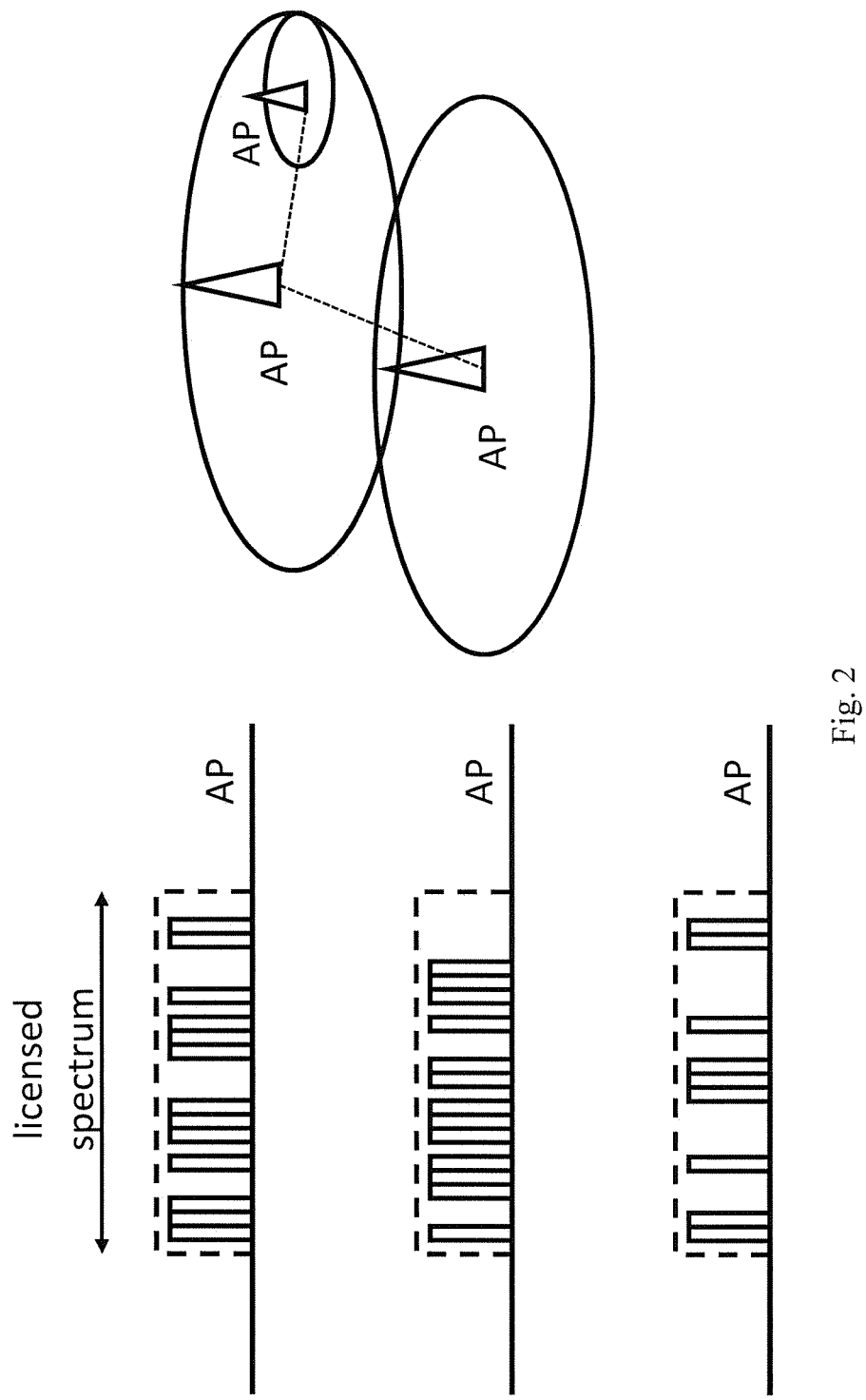
FIG. 2 shows an example of access point deployment with partial overlapping of resources and access point coordination for inter-cell interference coordination (ICIC)
Figure 3:
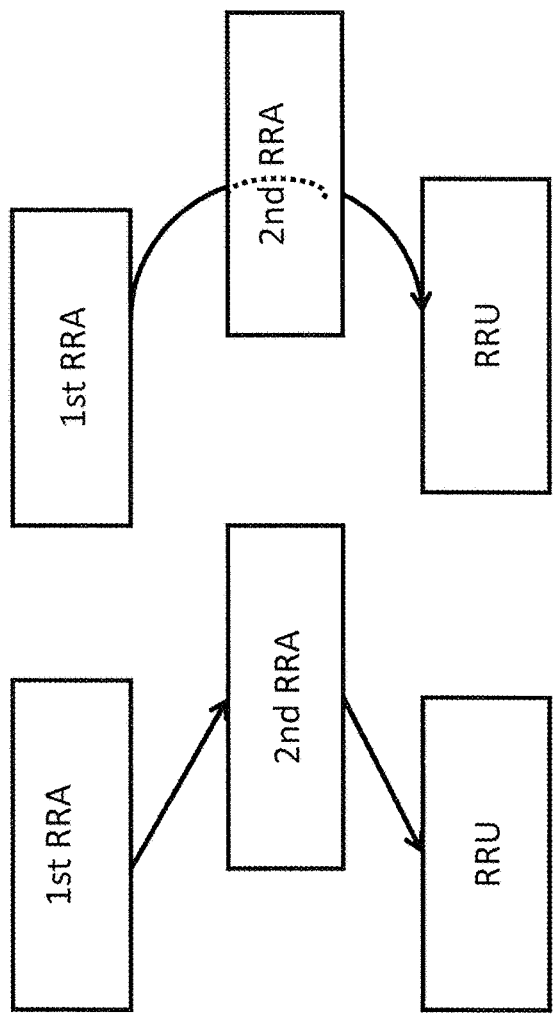
FIG. 3 shows a conceptual sketch of the present embodiment of the invention.

The present method in a first RRA of a first layer of RRAs comprises three main steps, namely:

The decision step: for at least one portion of the radio resources available to it, the first RRA decides whether a second RRA of a second layer, to which it allocates resources, should operate in a controlled mode or an autonomous mode. It should be noted that the operation mode may only refer to a certain part of the radio resources. Hence, the first RRA could determine that the second RRA should operate autonomously with respect to certain radio resources, and controlled with respect to other radio resources; and The first allocating step (see the left process in FIG. 3): if the second RRA is decided to operate in the autonomous mode with respect to a certain portion of the available radio resources, the portion of the radio resources is allocated to the second RRA indicating its autonomy with respect to further allocation decisions of those radio resources by the second RRA to its radio resource users and/or RRAs of a third lower layer, or The second allocating step (see the right process in FIG. 3): if the second RRA is determined to operate in the controlled mode with respect to a certain portion of the available radio resource, the first RRA will administer all allocation of radio resources for the second RRA with respect to the portion of radio resources which means that the first RRA will allocate the at least one portion of available radio resources to radio resource users of the second radio resource allocator and/or RRAs of a third lower layer. In essence the second RRA will turn into a passive entity and may just relay the allocation of radio resources as determined by the first RRA to the RRAs or resource users immediately beneath it in the hierarchy.

The first RRA allocates a portion of the available radio resources, for a certain period of time to a second RRA. It may then assign another portion of the available radio resources to the same second RRA, another second RRA, etc. Moreover, if the second RRA is determined to use a portion of the available radio resources in an autonomous fashion, the second RRA administers the particular portion of the radio resources allocated to it by a first RRA. This second RRA then further allocates a portion of the radio resources allocated to it, to either its resource users or other RRAs, among its children RRAs of lower layers. For example, when the portion of available radio resources comprises a portion of frequency spectrum, a second RRA assigns a portion of the available spectrum allocated to it, for a certain period of time within the period of time allocated to it, to one of its radio resource users. It may then assign another portion of the spectrum to another of its radio resource users. This assignment then gives each radio resource user a grant to use the specific portion of the spectrum allocated to it for radio communication during a specified period of time.

The at least one portion of available radio resources may be any of frequency spectrum, fraction of time, and transmission power e.g. a maximum transmission power. Moreover, power allocation from a first RRA to a second RRA and/or to a resource user may imply the allocation of a set of resource parameters determining a power budget that the second RRA and/or resource user can use within the allocated portion of radio resource. The power budget can refer to the maximum transmission power that the second RRA or resource user can use within the allocated portion of radio resource. In another embodiment, the power budget refers to and/or determines the amount of transmission power to be used within the allocated portion of radio resource. When applied to an RRA, the scheduled power corresponds to the maximum power that this node can allocate to its children RRAs or resource users. When applied to a resource user, the scheduled power corresponds to the maximum power that can be used by said resource user for transmission. This might be useful in dense network deployments where mobile stations are supposedly closer to access nodes or should only (or be forced to) connect with a very close access node. In one embodiment of the invention, when the radio resource allocated by a first RRA comprises at least portion of frequency spectrum and a set of parameters determining a power budget, the power budget applies to the frequency spectrum. In one example, dynamic configuration of on/off activity in different spectrum bands is associated with a non-zero/zero power budget for each spectrum band, respectively.

In frequency division duplex (FDD) systems the portion of available radio resources is used by radio resource users for uplink or downlink communication in cellular systems. However, in time division duplex (TDD) systems the portion of available radio resources can be used for both uplink and downlink communication.

The embodiments of the invention improve the above described prior art in at least the following ways:

Over the prior art of "Frequency planning and frequency re-use" by providing flexibility to adapt to traffic load and network density during certain periods of time and in certain regions.

Over "Radio network controller node" in past cellular systems by faster adaptation.

Over "Multi-user scheduling within a cell" by also providing efficiency gains between different cells.

Over "Access-point on/off activity scheduling" and "Inter-cell interference coordination (ICIC)" by providing centralized hierarchical control which gives better performance, e.g. in terms of energy consumption per bit, or network throughput.

In one example of the invention, allocation of radio resources may be understood as the "right to use" and hence an RRA or radio resource user being allocated are not mandated to actually use this radio resource for further allocation (by RRAs) or for radio transmission (by users of the radio resource). In another example, allocation may be understood as a "directive from one RRA to another RRA of radio resource user" and hence the RRA or RRU receiving the allocation message is forced to use the allocated radio resource for further allocation (by RRAs) or for radio transmission (RRUs).

If a second RRA is determined to use a portion of the available radio resources in a controlled fashion, the second RRA does not administer independently the particular portion of the radio resources. Instead, the first RRA directly allocates a portion of the radio resources to RRUs or children RRAs of the second RRA. For example, a first RRA decides that a second RRA operates in a controlled fashion and allocates one portion of the spectrum, for a certain period of time within the period of time allocated to it, to one of the second RRA's RRUs. It may then assign another portion of its available spectrum to another of the second RRA's RRUs or children RRAs. This assignment then gives each of the RRUs a grant to use the specific portion of the spectrum allocated to it for radio communication during a specified period of time.

According to an embodiment of the invention any of the decision step, the first allocating step or the second allocating step is based on a feedback signalling message.

As for the feedback signalling message in the decision step mentioned feedback signalling message is preferably signalled from the second RRA and/or RRUs of the second RRA and/or the RRAs of the third lower layer.

Regarding the first and/or the second allocating steps these steps are according to another embodiment of the invention based on a feedback signalling message from the second RRA.

However, according to yet another embodiment, the first and/or the second allocating step is based on a feedback signalling message from RRUs of the second RRA and/or the RRAs of the third lower layer.

In the same network structure, RRUs report to its parent RRA at least an indicator reflecting a suitable performance measure of the communication channel it could use, and/or a further indicator reflecting the RRU's traffic demand and/or type of traffic.

According to an embodiment of the invention, the feedback signalling message from the second RRA is representative of information or performance metrics related to the children RRAs or RRUs immediately beneath it in the hierarchy. Said information and/or performance metrics can either relate to an aggregation of feedback received from RRUs of the second RRA and/or the RRAs of the third lower layer, or relate to individual feedback received from RRUs of the second RRA and/or the RRAs of the third lower layer.

It is in some cases beneficial for the first RRA to get a feedback message directly from RRUs of the second RRA and/or the RRAs of the third lower layer. One example is when the first RRA decides that the second RRA operates in the controlled mode and at the same time allocates radio resources to RRUs of the second RRA and/or the RRAs of the third lower layer, i.e. children of the second RRA. In practice, this reflects the case in which feedback from an RRU (e.g. UE) is received by its parent RRA (e.g. a pico node being a serving AP) as well as by the higher layer of RRAs (e.g. a macro node controlling the pico node). The feedback signalling may be a physical layer signal, e.g. uplink control channel in LTE, or a higher layer signal, e.g. RRC signalling in LTE.

Suitable information elements included in the above mentioned feedback signalling message may be, but are not limited to:

Individual required data rates of each of the RRUs served by the RRA, or an aggregate data rate of these RRUs. This feedback can take the form of a "bandwidth request" for resource granting prior to a planned transmission. This feedback can also take the form of a posterior "report" about the reception of previously transmitted data.

Individual latencies of each of the RRUs served by the RRA, or a latency value representative for these RRUs.

Individual energy consumption associated to each of the RRUs served by the RRA, or an aggregate energy consumption.

Fairness measures associated to each of the RRUs served by the RRA, or an aggregate fairness measure.

Functionality capabilities of a RRA. If a RRA cannot operate in an autonomous mode it informs the control node about this.

Number of served users by RRAs.

Individual traffic demand or aggregate traffic demand for RRUs.

All possible combinations thereof.

Other suitable performance measures may relate to the channel quality including:
Channel quality indicators (CQI),
Measurements of reference signals received power (RSRP),
Reference signals received quality (RSRQ),
Interference measurements.

For example, the allocation method deployed by the RRA evaluates the possible data rate for a number of allocation choices and decides for the particular allocation choice that maximizes a suitable performance criterion. In the same network structure, RRAs report to their respective parent RRAs at least an indicator reflecting a suitable performance measure of the communication channels it could use for communications and/or an indicator reflecting a suitable performance measure of the underlying RRAs and/or RRUs. The allocation of the radio resources to underlying RRAs or RRUs is done based on this performance measures. Based on feedback, radio resource allocation decisions may be reassessed at any time.

According to an embodiment of the invention, the above mentioned feedback signalling message can be signalled by either a physical layer channel, such as a control channel or a data channel, or by a dedicated interface. For instance, in the related art LTE system, the mentioned above feedback could be signalled via the uplink physical control channel or by higher layer radio resource control (RRC) signalling through the physical shared data channel. The feedback message between RRAs could further be signalled through the X2 interface.

According to one embodiment, the allocation method deployed by an RRA evaluates the possible network data rate for a number of allocation choices and decides for the particular allocation choice that maximizes a suitable performance criterion.

Further, according to yet another embodiment of the invention the outcome of the decision step is signalled to the second RRA by means of a resource flag indicating whether the at least one portion of available radio resources is associated with the autonomous mode or the controlled mode. The resource flag can be a single bit referring to the entire portion of radio resources, with one value of the bit indicating an autonomous resource mode and another value of the bit indication a controlled resource mode. In alternative, the resource flag can be one or more bitmaps addressing each individual radio resource within the portion of radio resources allocated by the first RRA. Yet in another alternative, the resource flag is implicitly signalled to the receiver.

Furthermore, other important aspects of the embodiments of the invention are how, or in other words, by which means the first and the second allocating steps are performed.

According to an embodiment of the invention, the first allocating step is performed by means of a forward signalling message signalled to the second RRA. Also in this embodiment the further allocation performed by the second RRA of the at least one portion of available resources is performed based on the forward signalling message and/or feedback signalling message from its radio resource users and/or RRAs of a third lower layer. The signalling can also in this case may be performed by means of a physical layer signal, e.g. downlink control channel in LTE, or a higher layer signal, e.g. RRC signalling in LTE, or via a dedicated interface, e.g. the X2 interface in LTE.

According to another embodiment of the invention, the second allocating step is performed by means of a forward signalling message signalled to the radio resource users of the second RRA and/or RRAs of the third lower layer. The forward signalling message may in this case preferably be signalled via the second RRA to the radio resource users of the second RRA and/or RRAs of the third lower layer. The signalling can also in this case may be performed by means of a physical layer signal, e.g. downlink control channel in LTE, or a higher layer signal, e.g. RRC signalling in LTE, or via a dedicated interface, e.g. the X2 interface in LTE.

In both the first and the second allocating steps information about the allocated radio resources is of relevance to the receiver of the resources so that the resource can be identified and used accordingly. The information may e.g. relate to the frequency band, timing information and maximum transmission power of the resource. In this respect the forward signalling message includes information defining the allocated portion of available radio resources.

The embodiments of the invention disclosed here refers to a control plane solution (the control plane network of RRAs), and is in any embodiment associated to a data plane (employed by the RRUs). The radio resource management methods disclosed here refers to the usage of radio resources by RRUs for a particular data plane.

According to yet another embodiment of the present invention the first allocating step further involves restricting the further allocating, by the second radio resource allocator, by means of at least one restricting condition. The restricting condition may e.g. relate to one or more of one or more user categories; one or more device categories; one or more usage purposes; one or more traffic types; one or more services; one or more communication protocols; one or more application scenarios; or any combinations thereof. For example, considering the autonomous way where a first RRA assigns a specific portion of the radio resources to a second RRA, so as the second RRA can allocate these radio resources further. In an autonomous way without restrictions on the radio resources, the second RRA will freely allocate radio resources to any RRA or user (RRU). In an autonomous case with restrictions the first RRA may dictate to which subset of RRAs or RRUs, the second RRA can allocate further radio resources. For instance, first RRA may want to restrict the second RRA to allocate radio resources:

Among RRUs that are classified within certain categories, such as "platinum users" (user categories),
Among RRUs with certain device capabilities such as "HD-ready" devices (device category),
Among RRUs or RRAs that can use it for "relaying" (purpose of usage)
For a specific service such as "VoIP" (service category),
For any combination of the above, for instance, radio resources can be allocated among RRUs that are classified as "platinum users" (user categories), and have device capabilities such as "HD-ready".

With other words, by means of restrictions the first RRA defines the subset of all RRAs and RRUs, to which radio resources should be allocated. Again it is still the second RRA who decides how radio resources should be shared among its children.

The restricting condition can e.g. be signalled to the second RRA by means of a restricting condition flag. For example, associated with each portion of radio resource allocated from a first RRA to a second RRA or resource user is a condition flag indicator when the portion of radio resources is allocated for autonomous use under the terms and conditions imposed by the condition flag. The condition flag e.g. imposes explicit restrictions to whom, for what, to what extent, and under what circumstances a resource flagged for autonomous allocation can be further allocated.

The condition flag can be signalled as a number of bits referring to the conditions that would apply for the allocation for resources. The first bit may indicate the type of category, such as user, device, traffic, service, etc., and the remaining bits indicate an instance of that category, such as, gold user, smartphone, data, file transfer, etc. Alternatively, the condition flag may be implicitly signalled to the receiver.

For example, the condition flag can be implemented by one binary bit where 1 indicates that there are conditions associated to a radio resource, and 0 indicates that there are no conditions.

For the conditions bitmap there are at least two options to convey this information: 1) by using a hierarchical conditions bitmap on n-bits where the first k bits indicate category and the remaining n-k bits indicate category value, or 2) by using a flat conditions bitmap on n-bits that indicate category values.

It should further be noted that different portions of resources to the same second RRA can be associated with the autonomous mode and the controlled mode of the second RRA. For example, 3 portions of resources could be allocated to the second RRA for further allocation (autonomous mode) while 1 portion of resources is directly administrated by the first RRA (controlled mode). In one example of this embodiment, the controlled portion of radio resources can be used for radio self-backhauling. In this context self-backhauling refers to a particular configuration of an access node where the access node uses the access spectrum for backhauling the data to the network (rather than for example using a wired or fibre connection or a microwave connection).

Figure 6:
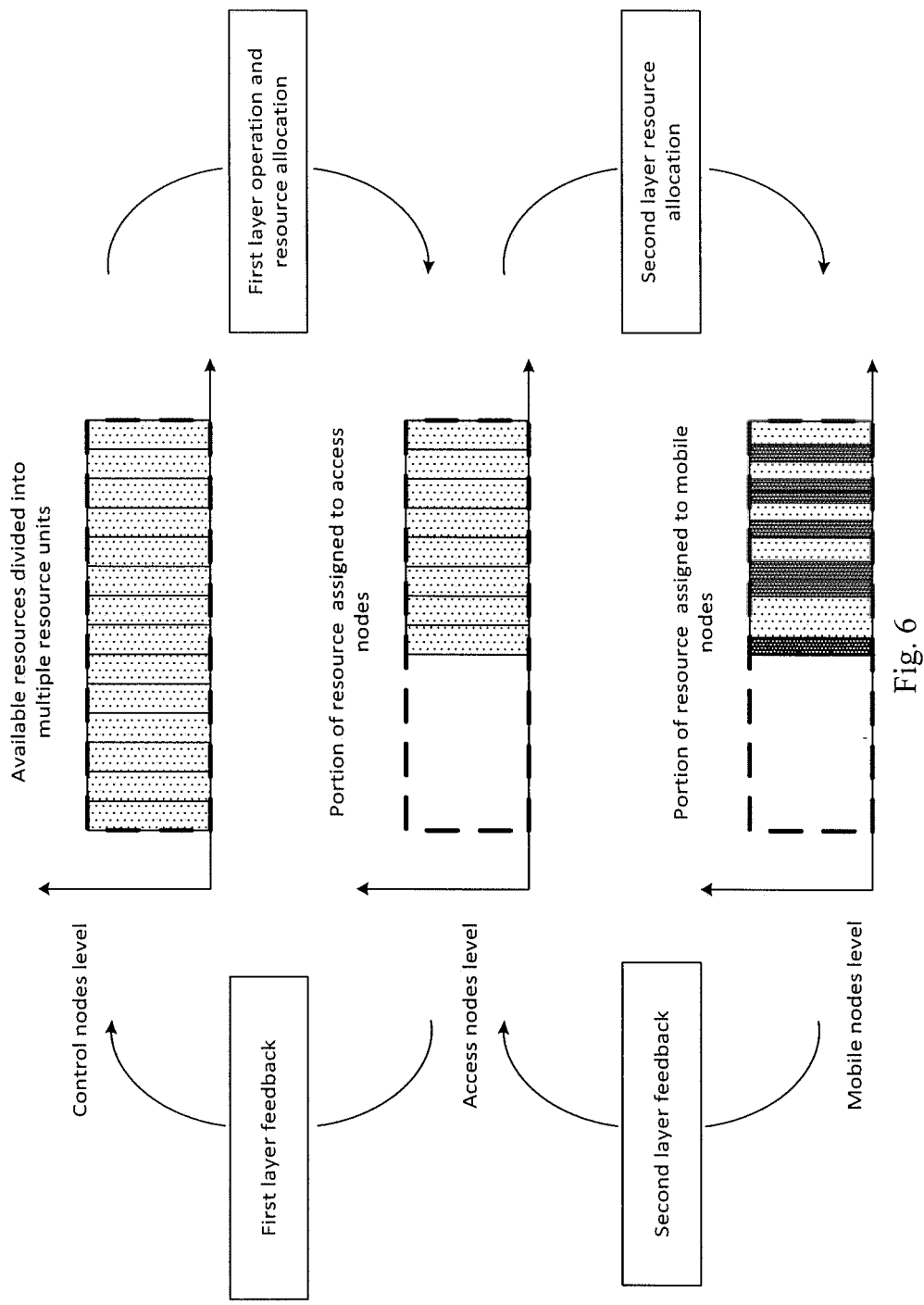
FIG. 6 illustrates two-layer approach to scheduling.

In some cases the network comprises of only two layers of RRAs as in FIG. 6. In these types of scenarios the first RRAs are control nodes, the second RRAs are access nodes and the radio resource users are mobile nodes according to another embodiment of the invention. The terminology access node broadly refer to a variety of network nodes, such as macro nodes, NodeB (NB), enhanced NodeB (eNB), pico-nodes, femto-nodes, home eNBs, relay nodes, remote radio heads, etc., unless the required by the context to address a specific technology. The terminology control node refers to functional node higher in the control-plan hierarchy of the network. The functional node can be integrated in an access node. The current generations cellular systems do not exhibit such a structure or node.

The purpose of the upper layer allocation (control node to access node, or parent RRA to child RRA) in these scenarios is to track and adapt the allocation of radio resources to slow changes in the radio environment, such as changes in traffic demand, number of users (geographic migration), etc. The purpose of the lower layer allocation (access nodes to mobile nodes, or RRA to resource user) is on the other hand to track and adapt to fast variations in the radio channels due to fast fading effects. This feedback is present already in fourth generation systems but without the integration with an upper layer. The time scale of the lower layer feedback/allocation loop is faster than that of the upper layer feedback/allocation loop.

In the same network structure, an access node reports their respective control node at least an indicator reflecting a suitable performance measure of the communication channels it could use for communications and/or an indicator reflecting a suitable performance measure of the mobile nodes. The allocation of the radio resources by the control node to its access nodes is done based on these performance measures. Based on feedback, radio resource allocation decisions may be reassessed at any time. Moreover, the controlled/autonomous mode decision method deployed by a control node evaluates the possible network data rate for either of the two possible decisions and decides for the particular mode decision that maximizes a suitable performance criterion.

The time-scale of assignments from a control node to an access node is slower or at least equal to the frequency of assignments from access nodes to mobile nodes. The two layer allocation is illustrated in FIG. 6.

In one embodiment, RRAs residing at the same hierarchical layer of the network communicate and coordinate with each other for joint resource allocation to lower layers. This intra-layer control plane is the interface used by different RRAs to share and to negotiate radio resource pools, thereby enabling to shape, to optimize, to trade, and/or to rent the usage of the radio resource across the network. A horizontal control plane of RRAs allows two new networking and resource management concepts: intra-operator resource management and inter-operator resource management.

In the case of inter-operator resource management the RRA of each operator may permit allocation of radio resources to users of the other operator as secondary access users. This way an RRA may schedule access for the users of another operator's RRA.

Hence, RRAs belonging to same network operator may administer different geographical areas. A network operator can therefore optimize the operation of a large geographical area by acting at the RRA layer. In another embodiment, RRAs belonging to different network operators may administer the same geographical area. This offers the network operators serving a common geographical area the possibility to negotiate, bargain, trade, or rent to each other radio resources to optimize not only the operator's resource usage but also its revenue and CAPEX.

Horizontal coordination among RRAs is also beneficial when RRAs residing at the same hierarchical layer share common children in a layer beneath. Multiple RRAs residing at the same hierarchical layer can be connected to a set of common children RRA or RRUs at any layer beneath. The benefit of this is to enable dynamic resource reconfiguration in the network from one or multiple RRAs.

In one embodiment of the invention the RRUs are mobile nodes and/or access nodes in a cellular network and the resource allocation serves to reduce radio interference in the communication between mobile nodes and access nodes. In such a cellular system, the mobile nodes and the access nodes are physical nodes where data-plane communication takes place between these nodes. In this embodiment, the (functional) second RRA resides in the (physical) access node that allocates radio resources for the communication. Both the physical mobile node and the physical access node incorporate the functional radio resource user through their data-plane communication with each other. The physical access node thus includes the logical functions of radio resource user and second RRA. In this embodiment, the first RRA resides in a central physical network node, alternatively is physically co-located with one of a plurality of second RRAs in one of the physical access nodes.

In one embodiment of the invention the RRUs are mobile nodes in a device-to-device communication (mesh) network and the resource allocation serves to reduce radio interference in the communication between mobile device nodes and other mobile device nodes. A device-to-device communication (mesh) network may also be part of an overlay cellular network. In such a device-to-device communication (mesh) network, physical mobile nodes incorporate the functional RRU through their direct data-plane communication with each other. The functional second RRA can reside in a separate physical network node, or alternatively can be physically co-located with one of the plurality of RRUs in a mobile node.

In one embodiment of the invention, a RRA is functional entity integrated into a network access node and/or mobile nodes. A network access node is any network node used to access the network and/or providing a data plane either through an air and/or a wired interference. In one example, a RRA residing in a mobile node determines the resource allocation for at least a further mobile node in a device-to-device communication. In another example, a RRA resides in a fixed or mobile relay.

Further, in one embodiment, an RRA can concurrently (simultaneously) allocate resources to children RRA(s) and RRU(s). For instance, in one embodiment, the access node resides in a macro-cell base station in a cellular system where a first RRA allocates a portion of the radio resources to a second RRA residing in the pico-cell base station, residing under its macro cell coverage, for further allocation by a second RRA in the pico-cell base station to mobile nodes residing under the pico-cell base station's coverage, and at the same time the first RRA in the macro-cell base station directly allocates radio resources to radio resource users in mobile nodes at other areas of its macro cell coverage.

In one embodiment, an access node or a mobile node can be concurrently be an RRA and an RRU. For example, in one embodiment, a mobile node can be an RRU that uses portion of radio resources allocated to it by a parent RRA and, at the same time the mobile node can be a RRA that allocates another portion of the allocated radio resources by the parent RRA to children RRAs and/or RRUs. In one example, the mobile node comprises a relay node or a mobile device that uses portion of the allocated radio resources for its own traffic and another portion for relaying to other devices of the network.

In yet another embodiment of the present invention where at a certain time period, no radio resources are allocated to a RRA or a RRU, essentially this RRA or resource user is allowed to be (temporarily) switched off, and hence, in case the RRA or resource user is an access point in a cellular network, the allocation is related to the scheduling of access-point-activity and/or user-activity. Allocating resources to a switched off access point corresponds to a wake-up instruction. De-allocating resources or allocating no resources to an access point corresponds to an instruction for switched off or sleep mode operation.

Furthermore, as understood by the person skilled in the art, any method according to the embodiments of the invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The embodiments of the invention also relates to a first RRA comprising the necessary means/units/elements/components and being arranged to execute any of the methods according to the embodiments of the invention. The means/units/elements may e.g. be: memory, processing unit, receiving and transmitting means, interface units, coupling means between different components, protocols, power, antennas, etc.

Finally, it should be understood that the embodiments of the invention are not limited to the embodiments described above, but also relates to and incorporates all embodiments within the scope of the appended independent claims.

What is claimed is:

1. A method for use in a radio resource allocator of a radio access network including radio resource allocators of different hierarchical layers, the network comprising at least one first layer having at least one first radio resource allocator and at least one second layer having at least one second radio resource allocator, the first layer being a hierarchical higher layer in relation to the second layer, the method comprising:

deciding if the second radio resource allocator of the second layer should operate in an autonomous mode or in a controlled mode for at least one portion of available radio resources;

allocating the at least one portion of available radio resources to the second radio resource allocator if it is decided that the second radio resource allocator should operate in the autonomous mode, wherein the at least one portion of available resources is further allocated by the second radio resource allocator to its radio resource users or radio resource allocators of a third lower layer, and allocating the at least one portion of available radio resources to radio resource users of the second radio resource allocator or radio resource allocators of a third lower layer if it is decided that the second radio resource allocator should operate in the controlled mode.

2. The method according to claim 1, wherein the deciding is based on a feedback signalling message from the second radio resource allocator or radio resource users of the second radio resource allocator or the radio resource allocators of the third lower layer.

3. The method according to claim 1, wherein an outcome of the deciding is signalled to the second radio resource allocator by means of a resource flag indicating whether the at least one portion of available radio resources is associated with the autonomous mode or the controlled mode.

4. The method according to claim 1, wherein allocating the at least one portion of the available the second resource allocator is performed by means of a forward signalling message signalled to said second radio resource allocator.

5. The method according to claim 4, wherein allocating the at least one portion of available resources to the second radio resource allocator is performed based on the forward signalling message or feedback signalling message from its radio resource users or radio resource allocators of a third lower layer.

6. The method according to claim 1, wherein allocating the at least one portion of available radio resources to radio resource users is performed by means of a forward signalling message signalled to the radio resource users of the second radio resource allocator or radio resource allocators of the third lower layer.

7. The method according to claim 6, wherein the forward signalling message is signalled via the second radio resource allocator.

8. The method according to claim 6, wherein the forward signalling message comprises information defining the at least one portion of available radio resources.

9. The method according to claim 1, wherein allocating the at least one portion of available radio resources to the second radio resource allocator or allocating the at least one portion of available radio resources to radio resource users of the second radio resource allocator is based on a feedback signalling message from the second radio resource allocator.

10. The method according to claim 1, wherein allocating the at least one portion of available radio resources to the second radio resource allocator or allocating the at least one portion of available radio resources to radio resource users of the second radio resource allocator is based on a feedback signalling message from radio resource users of the second radio resource allocator or the radio resource allocators of the third lower layer.

11. The method according to claim 2, wherein the feedback signalling message comprises one or more in the group including: individual data rates or an aggregate data rate for radio resource users, individual latency or a representative latency for radio resource users, individual energy consumption or an aggregate energy consumption for radio resource users, individual fairness measure or an aggregate fairness measure for radio resource users, individual traffic demand or aggregate traffic demand for radio resource users, number of served users by an radio resources allocators, functional capabilities of a radio resource allocator, or combinations thereof.

12. The method according to claim 1, wherein at least one portion of available radio resources is associated with the autonomous mode and at least one another portion of available radio resources is associated with the controlled mode for the same second radio resource allocator.

13. The method according to claim 12, wherein the at least one another portion of available radio resources associated with the controlled mode is used for radio self-backhauling.

14. The method according to claim 1, wherein the network only has the first and the second layers of radio resources allocators such that first radio resource allocators of the first layer are control nodes, second radio resource allocators of the second layer are access nodes, and radio resource users are mobile nodes.

15. The method according to claim 1, wherein the at least one portion of available radio resources is any of frequency spectrum, fraction of time, and transmission power.

16. The method according to claim 1, wherein the at least one portion of available radio resources is used by radio resource users for uplink or downlink communication in a cellular Frequency Division Duplex (FDD) system or for uplink and downlink communication in a Time Division Duplex (TDD) system.

17. The method according to claim 1, wherein radio resource allocators of the same layer are arranged to coordinate allocation of available radio resources to lower layers.

18. The method according to claim 1, wherein allocating the at least one portion of available radio resources to the second radio resource allocator further comprises:
restricting allocating of the at least one portion of available radio resources by said second radio resource allocator by means of at least one restricting condition.

19. The method according to claim 18, wherein the at least one restricting condition is signalled to the second radio resource allocator by means of a restricting condition flag.

20. The method according to claim 18, wherein the at least one restricting condition relates to one or more in the group comprising: one or more user categories; one or more device categories; one or more usage purposes; one or more traffic types; one or more services; one or more communication protocols; one or more application scenarios; or any combinations thereof.

21. The method according to claim 1, wherein the network is a cellular communication system and the radio resource users are access nodes or mobile nodes.

22. The method according to claim 1, wherein the network is a mesh communication system and the radio resource users are mobile nodes.

23. A radio resource allocator device arranged for allocating radio resources in a radio access network including radio resource allocators of different hierarchical layers, the network comprising at least one first layer having at least one first resource allocator and at least one second layer having at least one second resource allocator, the first layer being a hierarchical higher layer in relation to the second layer, the radio resource allocator being a first radio resource allocator and configured to:
decide if a second radio resource allocator of the second layer should operate in an autonomous mode or in a controlled mode for at least one portion of available radio resources; and
allocate at least one portion of available radio resources to second radio resource allocator if it is decided that second radio resource allocator should operate in the autonomous mode, wherein at least one portion of available resources is further allocated by second radio resource allocator to its radio resource users or radio resource allocators of a third lower layer, and
allocate the at least one portion of available radio resources to radio resource users of second radio resource allocator or radio resource allocators of a third lower layer if it is decided that the second radio resource allocator should operate in the controlled mode.

\* \* \* \* \*